(12) United States Patent
Shimatani

(10) Patent No.: US 10,771,653 B2
(45) Date of Patent: Sep. 8, 2020

(54) IMAGE PROCESSING DEVICE, IMAGE READING APPARATUS, IMAGE PROCESSING METHOD

(71) Applicant: KYOCERA Document Solutions Inc., Osaka-shi, Osaka (JP)

(72) Inventor: Akira Shimatani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/423,714

(22) Filed: May 28, 2019

(65) Prior Publication Data

US 2019/0373135 A1 Dec. 5, 2019

(30) Foreign Application Priority Data

May 29, 2018 (JP) ................................ 2018-102208

(51) Int. Cl.
*H04N 1/409* (2006.01)
*H04N 1/00* (2006.01)

(52) U.S. Cl.
CPC ......... *H04N 1/409* (2013.01); *H04N 1/00013* (2013.01); *H04N 1/00068* (2013.01); *H04N 1/00082* (2013.01); *H04N 1/00092* (2013.01); *H04N 1/00806* (2013.01)

(58) Field of Classification Search
CPC ............... H04N 1/409; H04N 1/00013; H04N 1/00068; H04N 1/00082; H04N 1/00092; H04N 1/00806

USPC .......................... 358/452, 453, 1.9, 1.15, 448
See application file for complete search history.

(56) References Cited

U.S. PATENT DOCUMENTS

| | | | | |
|---|---|---|---|---|
| 2012/0188373 A1* | 7/2012 | Kwon | ..................... | H04N 1/409 348/148 |
| 2012/0200733 A1* | 8/2012 | Utsugi | ................... | H04N 1/409 348/223.1 |

FOREIGN PATENT DOCUMENTS

JP          2006100913 A       4/2006

* cited by examiner

*Primary Examiner* — Quang N Vo
(74) *Attorney, Agent, or Firm* — Alleman Hall Creasman & Tuttle LLP

(57) ABSTRACT

In an image processing device, a sampling portion selects, as a target line, each of four reference lines that pass through a pixel of interest in a 3×3 target pixel group. When a difference between data among a pair of neighboring pixels, positioned along the target line, is within a predetermined first selection reference range, and with respect to at least one of two areas on both sides of the target line, all differences among data of three neighboring pixels that exist in the area are within a predetermined second selection reference range, the sampling portion selects the pair of neighboring pixels as the sample pixels. When a difference between data of the pixel of interest and an average value of the sample pixels exceeds a predetermined correction reference range, the device corrects the data of the pixel of interest to a value based on the sample average value.

6 Claims, 3 Drawing Sheets

IMAGE PROCESSING DEVICE, IMAGE READING APPARATUS, IMAGE PROCESSING METHOD

INCORPORATION BY REFERENCE

This application is based upon and claims the benefit of priority from the corresponding Japanese Patent Application No. 2018-102208 filed on May 29, 2018, the entire contents of which are incorporated herein by reference.

BACKGROUND

The present disclosure relates to an image processing device that is configured to correct, in image data, pixel data including noise, an image reading apparatus that includes the image processing device, and an image processing method.

Conventionally, an image reading apparatus includes an image sensor and an AFE (Analog Front End) that is configured to convert an image signal, output from the image sensor, into two-dimensional image data. Furthermore, the image reading apparatus includes a transmission line for the image signal, or a motor driving circuit and a DC-DC converter circuit that both may cause electrical noise to be generated in the AFE.

As a result, a portion of a plurality of pieces of pixel data in the image data may include noise. The pixel data including noise appears in an image as unwanted dots or an image defect.

In addition, there is known an image processing device configured to set a mixture ratio in response to a difference, in image data, between data of a pixel of interest and data of surrounding pixels, and correct the data of the pixel of interest to a value that is obtained by mixing, using the mixture ratio, the data of the pixel of interest and an average value of the data of the surrounding pixels.

SUMMARY

An image processing device according to an aspect of the present disclosure is configured to correct, in two-dimensional target image data, pixel data that includes noise. The image processing device includes a target selection portion, a sampling portion, an average processing portion, and a data correction portion. The target selection portion sequentially selects, from the target image data, data of a 3×3 target pixel group that is made up of one pixel of interest and eight neighboring pixels that neighbor the pixel of interest. The sampling portion selects, for each piece of data of the target pixel group, sample pixels from the eight neighboring pixels, according to a predetermined rule. The average processing portion calculates, for each piece of data of the target pixel group, a sample average value that is an average value of data of the sample pixels. The data correction portion replaces, for each piece of data of the target pixel group, data of the pixel of interest with a correction value that is based on the sample average value, on a necessary condition that a difference of interest, that is a difference between the data of the pixel of interest and the sample average value, exceeds a predetermined correction reference range. The sampling portion selects, as a target line, each of four reference lines that respectively pass through the pixel of interest in a row direction, a column direction, and two diagonal directions that intersect the row and column directions. Furthermore, on a necessary condition that a difference between data of a pair of the neighboring pixels that are positioned neighboring the pixel of interest along the target line, is within a predetermined first selection reference range, and that with respect to at least one of two areas on both sides of the target line, all differences among data of three neighboring pixels that exist in the area are within a predetermined second selection reference range, the sampling portion selects the pair of neighboring pixels as the sample pixels.

An image reading apparatus according to another aspect of the present disclosure includes a document sheet reading device configured to read an image from a document sheet, and output image data that represents the read image, and the image processing device that is configured to process, as the target image data, the image data output from the document sheet reading device.

An image processing method according to another aspect of the present disclosure is a method of correcting, in two-dimensional target image data, pixel data that includes noise. The image processing method includes sequentially selecting, from the target image data, data of a 3×3 target pixel group that is made up of one pixel of interest and eight neighboring pixels that neighbor the pixel of interest. Furthermore, the image processing method includes selecting, for each piece of data of the target pixel group, sample pixels from the eight neighboring pixels, according to a predetermined rule. Furthermore, the image processing method includes calculating, for each piece of data of the target pixel group, a sample average value that is an average value of data of the sample pixels. Furthermore, the image processing method includes replacing, for each piece of data of the target pixel group, data of the pixel of interest with a correction value that is based on the sample average value, on a necessary condition that a difference of interest, that is a difference between the data of the pixel of interest and the sample average value, exceeds a predetermined correction reference range. Furthermore, in the selecting of the sample pixels, the image processing method includes selecting, as a target line, each of four reference lines that respectively pass through the pixel of interest in a row direction, a column direction, and two diagonal directions that intersect the row and column directions, and selecting, on a necessary condition that a difference between data between a pair of the neighboring pixels that are positioned neighboring the pixel of interest along the target line, is within a predetermined first selection reference range, and that with respect to at least one of two areas on both sides of the target line, all differences among data of three neighboring pixels that exist in the area are within a predetermined second selection reference range, the pair of neighboring pixels as the sample pixels.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
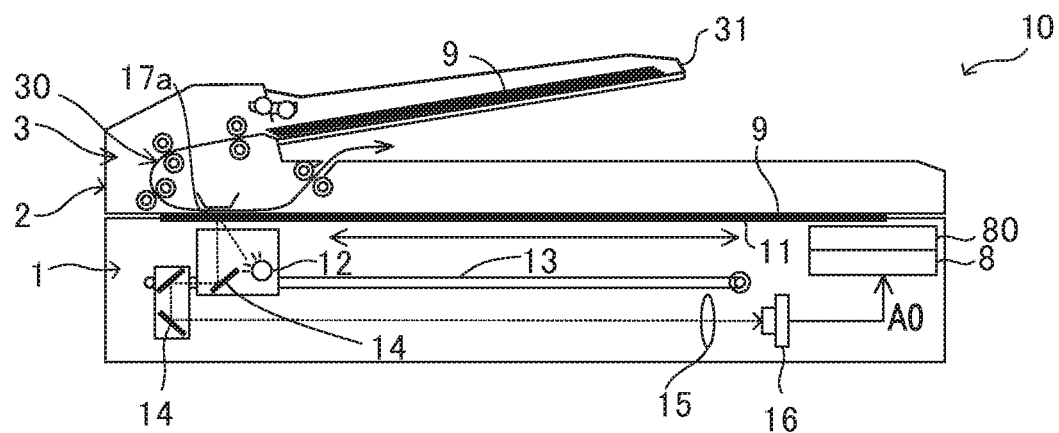
FIG. 1 is a configuration diagram showing an image reading apparatus according to an embodiment.

The following describes an embodiment of the present disclosure with reference to the accompanying drawings. It should be noted that the following embodiment is an example of a specific embodiment of the present disclosure and should not limit the technical scope of the present disclosure.

[Configuration of Image Reading Apparatus 10]

An image reading apparatus 10 according to the present embodiment executes a reading process of reading an image from a document sheet 9. The image reading apparatus 10 includes a document sheet scanning device 1, a document sheet table cover 2, a control device 8, and an operation/display device 80.

Furthermore, the image reading apparatus 10 includes an ADF (Automatic Document Feeder) 3 that is provided inside the document sheet table cover 2. The ADF 3 is configured to automatically convey, one sheet at a time, along a document sheet conveyance path 30, a plurality of document sheets 9 that are placed in a supplying tray 31.

The document sheet scanning device 1 includes a transparent document sheet table 11, a light emitting portion 12, a scanning mechanism 13, a plurality of mirrors 14, a lens 15, and an image sensor 16.

The image reading apparatus 10 is configured to execute the reading process of the document sheet 9 that is placed on the document sheet table 11, or conveyed by the ADF 3. The light emitting portion 12 is configured to irradiate a light on the document sheet 9 that is placed on the document sheet table 11, or conveyed by the ADF 3.

The plurality of mirrors 14 are configured to guide, to the image sensor 16, light reflected off the document sheet 9. The lens 15 is configured to gather, to a light receiving portion of the image sensor 16, the light guided to the image sensor 16 by the plurality of mirrors 14.

When the reading process is executed on the document sheet 9 placed on the document sheet table 11, the scanning mechanism 13 moves the light emitting portion 12 and the plurality of mirrors 14 along the document sheet table 11.

The image sensor 16 is configured to detect the amount of light reflected off the document sheet 9, and output an analog image signal A0 that is a detection signal of the amount of light. The image signal A0 represents the image read from the document sheet 9. The image sensor 16 shown in FIG. 1 is a CCD sensor.

An operation/display device 80 includes an operation device for receiving a user operation, and a display device for displaying information.

The control device 8 is configured to execute, based on information received via the operation/display device 80 and detection results of various sensors, various data processes, and to control various devices that are included in the image reading apparatus 10. Furthermore, the control device 8 executes various types of signal processing on the image signal A0 that is output by the image sensor 16.

Figure 2:
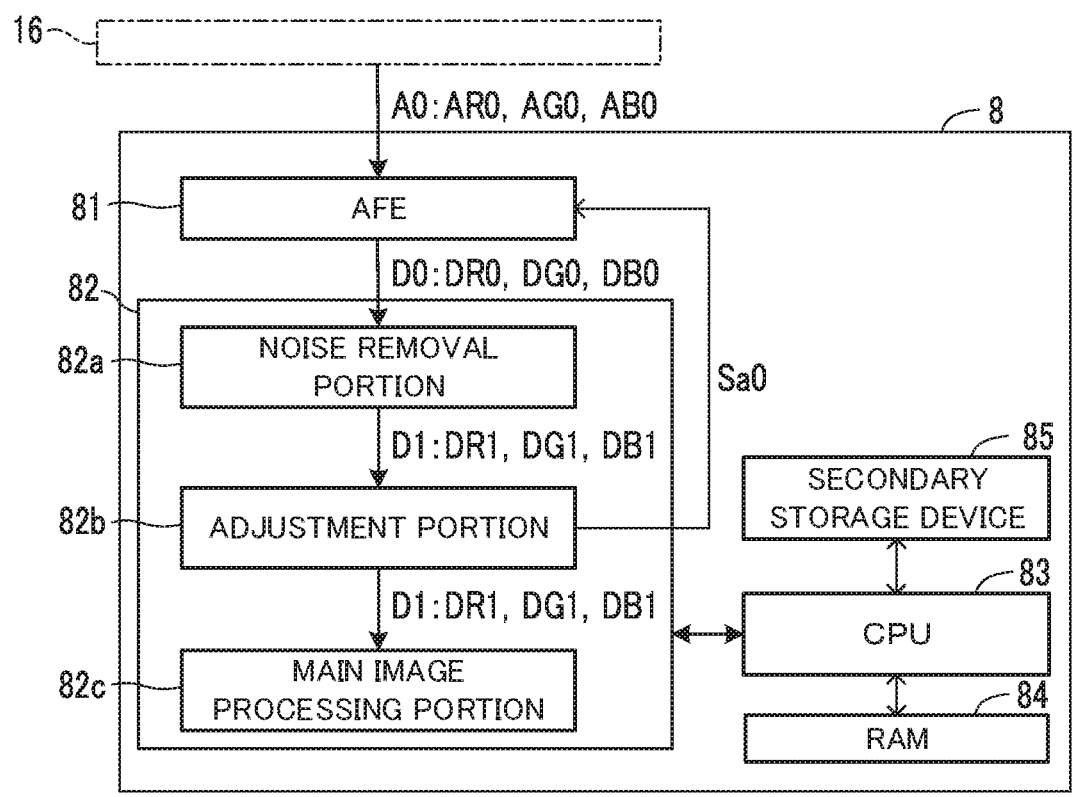
FIG. 2 is a block diagram showing a data processing device in the image reading apparatus according to the embodiment.

As shown in FIG. 2, the control device 8 includes an AFE 81, an image processing device 82, a CPU (Central Processing Unit) 83, a RAM (Random Access Memory) 84, and a secondary storage device 85.

The AFE 81 is configured to convert the image signal A0 into digital original image data D0. More specifically, the AFE 81, in response to the level of a preadjusted adjusted signal Sa0, conducts offset adjustment on the image signal A0, and amplifies the signal on which the offset adjustment has been conducted. Then, the AFE 81 generates the two-dimensional original image data D0 by converting the amplified signal into a digital signal.

It is noted that the image sensor 16 sequentially outputs the image signal A0 that represents one line of the document sheet 9 in the row direction. Furthermore, the AFE 81 outputs the two-dimensional original image data D0 by sequentially outputting a plurality of pieces of line image data that each include one line of pixel data.

The document sheet scanning device 1 and the AFE 81 are examples of a document sheet reading device for reading an image from the document sheet 9, and outputting two-dimensional image data that represents the read image.

In the present embodiment, the image sensor 16 is a color image sensor for reading a color image from the document sheet 9. Accordingly, the image sensor 16 outputs, as the image signal A0, three monochromatic image signals AR0, AG0, and AB0 that each represent an image of one of three different color components. That is, the image signal A0 includes a red image signal AR0, a green image signal AG0, and a blue image signal AB0.

In addition, the AFE 81 converts the three monochromatic image signals AR0, AG0, and AB0 into three pieces of monochromatic data DR0, DG0, and DB0. That is, the original image data D0 includes red image data DR0, green image data DG0, and blue image data DB0. The three pieces of monochromatic image data DR0, DG0, and DB0 respectively represent images of three different color components that are included in the same image.

The image processing device 82 is configured to perform various types of data processing on the original image data D0. The image processing device 82 is realized by a processor such as a DSP (Digital Signal Processor) or an MPU (Micro Processing Unit).

The image processing device 82 operates, by executing various programs, as a noise removal portion 82a, an adjustment portion 82b, and a main image processing portion 82c. In other words, the image processing device 82 includes the noise removal portion 82a, the adjustment portion 82b, and the main image processing portion 82c.

The noise removal portion 82a executes an image noise removal process for correcting pixel data, in the original image data D0, that includes noise. The red image data DR0, green image data DG0, and blue image data DB0 of the original image data D0 are each an example of target image data that is a target for correction of pixel data including noise.

That is, the noise removal portion 82a of the image processing device 82 processes, as the target image data, each of the red image data DR0, green image data DG0, and blue image data DB0 that are output by the document sheet reading device.

Hereinafter, image data that is obtained upon performing the image noise removal process on the original image data D0 is referred to as primary image data D1. The primary image data D1 includes red image data DR1, green image data DG1, and blue image data DB1 that have been subjected to the image noise removal process.

The adjustment portion 82*b* is configured to adjust the level of the adjusted signal Sa0 in response to a central value of the primary image data D1 that is obtained when the light emitting portion 12 is not emitting light. The adjustment portion 82*b* then supplies the adjusted signal Sa0 to the AFE 81. The main image processing portion 82*c* performs various correction processes and other image processing on the primary image data D1.

It is noted that a part or all of the image processing device 82 may be realized by an ASIC (Application Specific Integrated Circuit) or another hardware circuit.

The CPU 83 is configured to control the devices included in the image reading apparatus 10 by executing programs that are stored in advance in the secondary storage device 85. For example, the CPU 83 outputs a command signal for starting processing that is executed by each of the AFE 81, the light emitting portion 12, the image sensor 16, and the image processing device 82.

The secondary storage device 85 is a non-volatile, computer-readable storage device. The secondary storage device 85 is configured to store programs and various types of data. For example, one or both of a flash memory and a hard disk drive are adopted as the secondary storage device 85.

The RAM 84 is a volatile storage device for primary storage of the programs executed by the CPU 83, and data to be output and referred to during the execution of the programs by the CPU 83.

The image reading apparatus 10 includes a motor driving circuit and a DC-DC converter circuit, both of which are not shown. High frequency circuits such as the motor driving circuit and the DC-DC converter circuit may become sources of electrical noise that is generated in the transmission line of the image signal A0 or in the AFE 81.

As a result, some pieces of pixel data in the original image data D0 may include noise. Pixel data including noise appears in an image as unwanted dots or an image defect.

In the following description, in an image represented by the red image data DR0, green image data DG0, and blue image data DB0, a pixel that is selected at any time from a plurality of pixels is referred to as a pixel of interest P22 (see FIG. 4).

Meanwhile, data of the pixel of interest P22 in the original image data D0 may be corrected at any time using an average value of the data of neighboring pixels. In this case, there is a risk that a portion of the image where image density changes suddenly, such as an edge or fine line portion, becomes blurred due to smoothing of the pixel data. It is noted that the neighboring pixels are pixels that are positioned within a predetermined range around the pixel of interest P22.

On the other hand, in the image reading apparatus 10, the noise removal portion 82*a* of the image processing device 82 executes an image noise removal process, described below, on the original image data D0. With this configuration, it is possible for the noise removal portion 82*a* to correct the pixel data including the noise, while avoiding occurrence of image quality deterioration in a portion where image density changes suddenly in the image represented by the original image data D0.

In the following description, the eight pixels that neighbor the pixel of interest P22 in the image represented by the red image data DR0, green image data DG0, and blue image data DB0, are referred to as neighboring pixels. In FIG. 4, the eight pixels P11, P12, P13, P21, P23, P31, P32, and P33 are the neighboring pixels.

Figure 4:
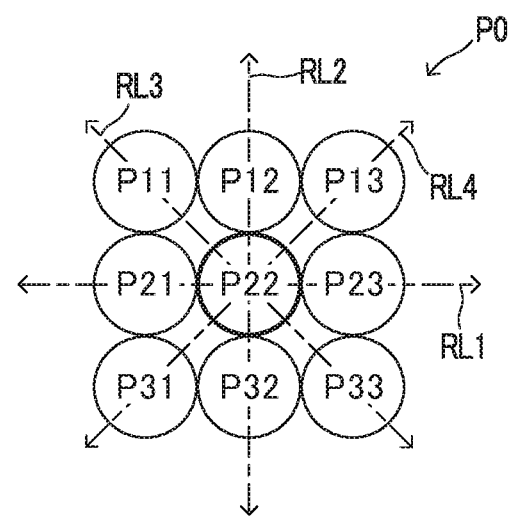
FIG. 4 is a diagram schematically showing a target pixel group that is selected, from a plurality of pixels included in an image represented by image data, by the image reading apparatus according to the embodiment.

Furthermore, as shown in FIG. 4, a 3×3 pixel group made up of the one pixel of interest P22 and the eight neighboring pixels that neighbor the pixel of interest P22, is referred to as a target pixel group P0. The target pixel group P0 is selected at any time from a plurality of pixels in the image represented by the red image data DR0, green image data DG0, and blue image data DB0.

Furthermore, as shown in FIG. 4, four lines that pass through the pixel of interest P22 in the target pixel group P0, each extending along a row direction, a column direction, and two diagonal directions that intersect the row and column directions, are referred to as reference lines RL1 to RL4.

The four reference lines RL1 to RL4 include a first reference line RL1 that extends along the row direction, a second reference line RL2 that extends along the column direction, a third reference line RL3 that extends along one of the two diagonal directions, and a fourth reference line RL4 that extends along the other diagonal direction.

The first reference line RL1 and second reference line RL2 intersect orthogonally at the pixel of interest P22, and the third reference line RL3 and the fourth reference line RL4 intersect orthogonally at the pixel of interest P22.

[Image Noise Removal Process]

In the following, with reference to the flowchart shown in FIG. 3, an example procedure of the image noise removal process is described.

Figure 3:
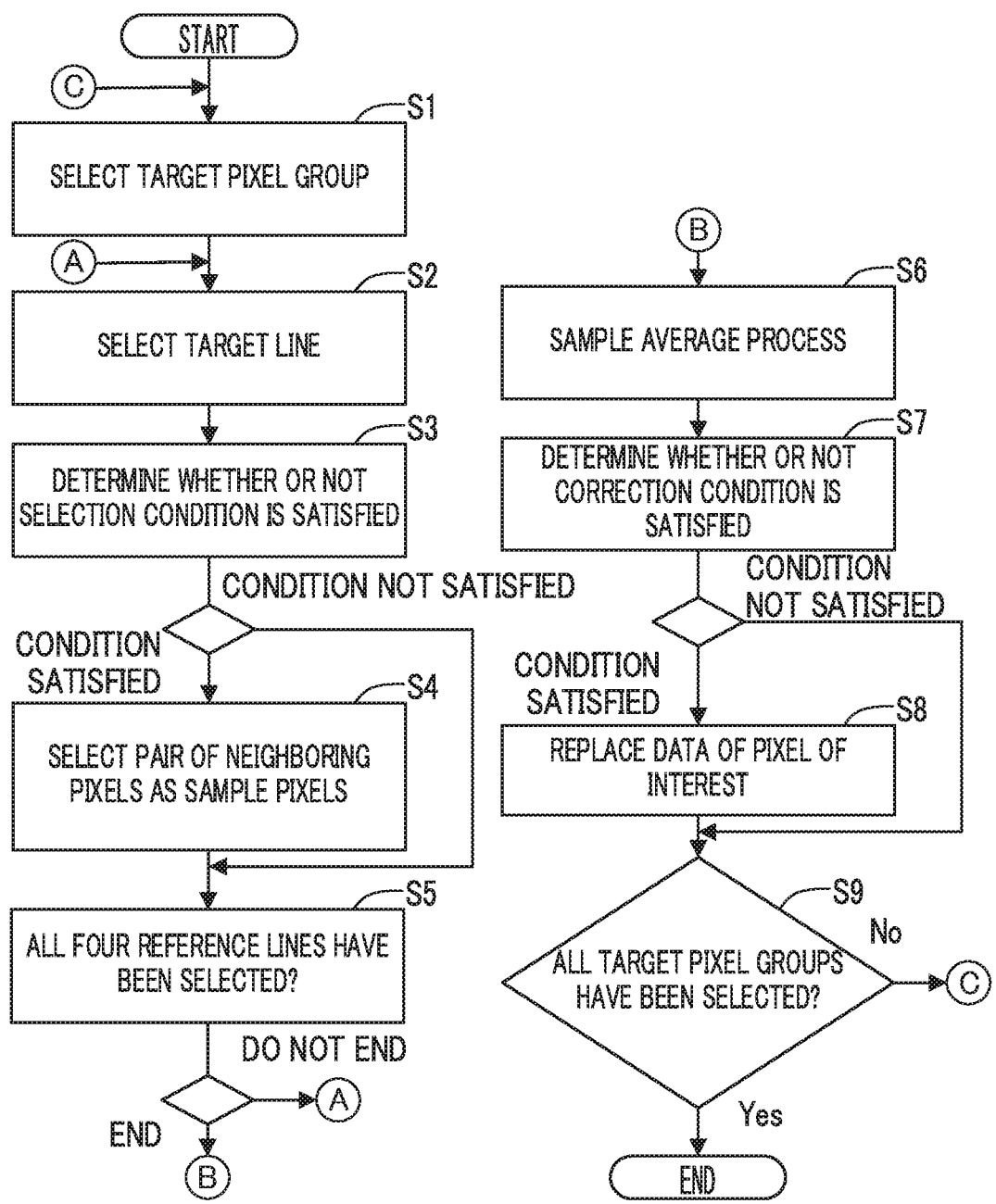
FIG. 3 is a flowchart showing an example procedure of an image noise removal process executed in the image reading apparatus according to the embodiment.

The noise removal portion 82*a* executes the image noise removal process shown in FIG. 3 on the red image data DR0, green image data DG0, and blue image data DB0.

In the following description, the red image data DR0, green image data DG0, and blue image data DB0 to be processed in the image noise removal process, are each referred to as target image data.

In the following description, S1, S2, . . . indicate identification codes of multiple steps in the image noise removal process.

<Step S1>

In the image noise removal process, the noise removal portion 82*a* first selects, from data of a plurality of pixels in the target image data, data of the target pixel group P0 that includes the pixel of interest P22.

Each time the processing in step S1 is executed, the noise removal portion 82*a* sequentially selects, from the target image data, data of one 3×3 target pixel group P0 that is made up of the one pixel of interest P22 and the eight neighboring pixels that neighbor the pixel of interest P22.

By executing the processing in step S1, all pixel data of the target image data, excluding data of pixels that form an edge of the image area, is selected as data of the pixel of interest P22. The noise removal portion 82*a* that executes the processing in step S1 is an example of a target selection portion.

<Step S2>

Next, the noise removal portion 82*a* selects one of the four reference lines RL1 to RL4 as a target line. In the description below, two of the neighboring pixels that neighbor the pixel of interest P22 along the target line, are collectively referred to as a neighboring pixel pair. Each time the processing in step S2 is executed, the noise removal portion 82*a* selects, as the target line, each of all four reference lines RL1 to RL4.

<Step S3>

Next, the noise removal portion 82*a* determines whether or not a predetermined selection condition is satisfied. The selection condition is for determining whether or not to select, as sample pixels, the neighboring pixel pair that neighbor the pixel of interest P22 along the target line. The sample pixels are pixels to be processed in a sample average process that is described below.

The selection condition is that both of a first selection condition and a second selection condition, described below, are satisfied. That is, a necessary condition of the selection condition is that both the first selection condition and the second selection condition are satisfied.

The first selection condition is that the difference between data of the neighboring pixel pair is within a predetermined first selection reference range.

For example, the first selection condition is that the absolute value of the difference between data of the neighboring pixel pair is not larger than a predetermined first selection threshold. The first selection threshold is a positive value.

The second selection condition is that, with respect to at least one of two areas on both sides of the target line, all differences among data of the three neighboring pixels that exist in the area are within a predetermined second selection reference range.

For example, the second selection condition is that, with respect to at least one of two areas on both sides of the target line, the absolute values of all differences among data of the three neighboring pixels that exist in the area are not larger than a predetermined second selection threshold. The second selection threshold is a positive value. It is noted that the absolute values of the differences among the pieces of data of the three neighboring pixels are three values corresponding to the three pairing combinations of the three neighboring pixels.

It is noted that the first selection reference range and the second selection reference range may be the same range. That is, the first selection threshold and the second selection threshold may be the same value.

As shown in FIG. 4, when the target line is the first reference line RL1, the neighboring pixels P11, P12, and P13 exist in one of the two areas on both sides of the target line, and the neighboring pixels P31, P32, and P33 exist in the other area.

Similarly, when the target line is the second reference line RL2, the neighboring pixels P11, P21, and P31 exist in one of the two areas on both sides of the target line, and the neighboring pixels P13, P23, and P33 exist in the other area.

Similarly, when the target line is the third reference line RL3, the neighboring pixels P12, P13, and P23 exist in one of the two areas on both sides of the target line, and the neighboring pixels P21, P31, and P32 exist in the other area.

Similarly, when the target line is the fourth reference line RL4, the neighboring pixels P11, P12, and P21 exist in one of the two areas on both sides of the target line, and the neighboring pixels P23, P32, and P33 exist in the other area.

In addition, for example, when the target line is the first reference line RL1, the second selection condition is that the difference between data of the neighboring pixels P11 and P12, the difference between data of the neighboring pixels P11 and P13, and the difference between data of the neighboring pixels P12 and P13, are all within the second selection reference range, or that the difference between data of the neighboring pixels P31 and P32, the difference between data of the neighboring pixels P31 and P33, and the difference between data of the neighboring pixels P32 and P33, are all within the second selection reference range.

When the noise removal portion 82a determines that the selection condition is satisfied, the noise removal portion 82a moves the process to step S4, and otherwise, the noise removal portion 82a moves the process to step S5.

<Step S4>

In step S4, the noise removal portion 82a selects, as the sample pixels, the neighboring pixel pair corresponding to the target line. Then, the noise removal portion 82a moves the process to step S5.

<Step S5>

In step S5, when all four reference lines RL1 to RL4 have been chosen as the target line in step S2, the noise removal portion 82a moves the process to step S6, and otherwise, the noise removal portion 82a moves the process to step S2.

In steps S2 to S5, for each target pixel group P0 whose data is selected in step S1, the noise removal portion 82a selects the sample pixels from the eight neighboring pixels according to a predetermined rule. The noise removal portion 82a that executes the processing in steps S2 to S5 is an example of a sampling portion.

It is noted that the predetermined rule is to select the sample pixels in response to whether or not the selection condition is satisfied.

Processing in steps S1 to S5 determines whether or not neighboring pixel pairs corresponding to all of the four reference lines RL1 to RL4 have been selected as the sample pixels.

<Step S6>

In step S6, the noise removal portion 82a executes the sample average process on the data of each target pixel group P0.

The sample average process is for calculating the average value of the data of the sample pixels. Hereinafter, the average value that is calculated in step S6 is referred to as a sample average value. It is noted that the noise removal portion 82a that executes processing in step S6 is an example of an average processing portion.

<Step S7>

Next, the noise removal portion 82a determines, for the data of each target pixel group P0, whether or not the data satisfies a predetermined correction condition. A necessary condition of the correction condition is that at least a reference correction condition, described below, is satisfied.

The reference correction condition is that a difference between data of the pixel of interest P22 and the sample average value exceeds a predetermined correction reference range.

For example, the reference correction condition is that an absolute value of the difference between data of the pixel of interest P22 and the sample average value, is larger than the predetermined correction reference value. The correction reference value is a positive value.

Then, when the noise removal portion 82a determines that the correction condition is satisfied, the noise removal portion 82a moves the process to step S8, and otherwise, the noise removal portion 82a moves the process to step S9.

<Step S8>

In step S8, for the data of each target pixel group P0, the noise removal portion 82a replaces the data of the pixel of interest P22 with a correction value that is based on the sample average value.

In the present embodiment, the correction value is the sample average value. Next, the noise removal portion 82a moves the process to step S9.

<Step S9>

In step S9, when data of all target pixel groups P0 that can be selected from the target image data by processing in step S1 have been selected, the noise removal portion 82a ends the image noise removal process, and otherwise, the noise removal portion 82a moves the process to step S1.

As described above, in steps S7 and S8, the noise removal portion 82a, for the data of each target pixel group P0, replaces the data of the pixel of interest P22 with the correction value that is based on the sample average value, on the necessary condition that the difference between data of the pixel of interest P22 and the sample average value exceeds the correction reference range.

It is noted that the noise removal portion 82a that executes processing of steps S7 and S8 is an example of a data correction portion.

The data of the eight neighboring pixels may include data representing a portion of the image where image density changes suddenly, such as an edge or fine line portion. In this case, in steps S2 to S4 of the image noise removal process, data of the neighboring pixels in the portion where image density changes suddenly, is excluded from the sample pixels.

With this configuration, it is possible to prevent the data of the neighboring pixels in the portion where image density changes suddenly, from being reflected in the sample average value and causing the data of the pixel of interest P22 to be corrected to an unsatisfactory pixel value.

That is, by adopting the image processing device 82, it is possible to correct pixel data including noise while avoiding occurrence of image quality deterioration in the portion where image density changes suddenly in the target image data.

First Application Example

In the following, a description is given of a first application example of the image processing device 82 that can be applied to the image reading apparatus 10.

When the image sensor 16 is the CCD sensor, among a plurality of signals, each representing a pixel, that are included in the three monochromatic image signals AR0, AG0, and AB0, signals that represent the same pixel are detected at the same time. In this case, noise caused by a high frequency unit such as the motor driving circuit or the DC-DC converter circuit is applied in the same direction on the signals that represent the same pixel in the three monochromatic image signals AR0, AG0, and AB0.

That is, when the image sensor 16 is the CCD sensor, noise is generated in the same direction in pieces of data that represent the same pixel in the three pieces of monochromatic image data DR0, DG0, and DB0. It is noted that the same direction refers to a direction in which pixel data becomes higher or lower than a true value.

Accordingly, it is possible to perform data correction with fewer mistakes by including, in the correction condition in step S7 of FIG. 3, a further necessary condition that data of the same pixel of interest P22 included in the three pieces of monochromatic image data DR0, DG0, and DB0 show a similar tendency.

In step S7 of FIG. 3, the noise removal portion 82a according to the present application example determines whether or not the correction condition, having the reference correction condition and an auxiliary correction condition described below as further necessary conditions, is satisfied.

Hereinafter, a difference between the data of the pixel of interest P22 in the data of the target pixel group P0, and the sample average value is referred to as a difference of interest.

The auxiliary correction condition is that the difference of interest of the target image data, and two differences of interest of corresponding data of the target pixel group P0 in monochromatic image data of the other two color components, have the same sign, or are within a predetermined range. The differences of interest are considered to be in the same range even when the differences of interest are zero.

Furthermore, the differences of interest are considered to be in the same range when one of the differences of interest is a negative value close to zero, and another is a positive value close to zero.

In other words, the noise removal portion 82a according to the present application example replaces, for each piece of data of the target pixel group P0, the data of the pixel of interest P22 in the target image data with a corrected value that is based on the sample average value, on the further necessary condition that the difference of interest of the target image data and the differences of interest of corresponding data of the target pixel group P0 in monochromatic image data of the other two color components, have the same sign, or are within the same predetermined range.

It is noted that when the red image data DR0 is the target image data, the monochromatic image data of the other two color components are the green image data DG0 and the blue image data DB0. Similarly, when the green image data DG0 is the target image data, the monochromatic image data of the other two color components are the red image data DR0 and the blue image data DB0. Similarly, when the blue image data DB0 is the target image data, the monochromatic image data of the other two color components are the red image data DR0 and the green image data DG0.

By adopting the present application example, the same effect as the embodiment described above can be achieved.

Second Application Example

In the following, a description is given of a second application example of the image processing device 82 that can be applied to the image reading apparatus 10.

In step S7 of FIG. 3, the noise removal portion 82a according to the present application example determines in two stages whether or not the correction condition is satisfied. Furthermore, in step S8 of FIG. 3, the noise removal portion 82a according to the present application example corrects, in response to the determination result of the correction condition, the data of the pixel of interest P22 by two methods.

Specifically, in step S7 of FIG. 3, the noise removal portion 82a determines whether or not the difference of interest is in a first correction-requiring state, and whether or not the difference of interest is in a second correction-requiring state.

The first correction-requiring state is a state where the difference of interest exceeds a predetermined first correction reference range. In addition, the second correction-requiring state is a state where the difference of interest is within the first correction reference range, and exceeds a predetermined second correction reference range. The second correction reference range is a part of the first correction reference range.

The first correction-requiring state is a state where a relatively large amount of noise, caused by the high frequency circuit, is detected in the pixel of interest P22. On the other hand, the second correction-requiring state is a state where a relatively small amount of noise, caused by an intrinsic characteristic of the image sensor 16, is detected in the pixel of interest P22.

For example, when the absolute value of the difference of interest is larger than a predetermined first correction reference value, the noise removal portion 82a determines that the difference of interest is in the first correction-requiring state.

In addition, when the absolute value of the difference of interest is less than or equal to the first correction reference value, and is larger than a predetermined second correction reference value that is smaller than the first correction reference value, the noise removal portion 82a determines that the difference of interest is in the second correction-requiring state.

Then, when the noise removal portion 82a determines that the difference of interest is in the first correction-requiring state, in step S8 of FIG. 3, the noise removal portion 82a replaces the data of the pixel of interest P22 with the sample average value. In this case, the sample average value is the correction value.

On the other hand, when the noise removal portion 82a determines that the difference of interest is in the second correction-requiring state, in step S8 of FIG. 3, the noise removal portion 82a replaces the data of the pixel of interest P22 with a weighted average value of the data of the pixel of interest P22 and the sample average value. In this case, the weighted average value is the correction value.

It is noted that the weight coefficients of the data of the pixel of interest P22 and the sample average value are predetermined values.

By adopting the present application example, the same effect as the embodiment described above can be achieved. Furthermore, according to the present application example, it is possible to appropriately correct pixel data including a relatively small amount of noise, such as random noise and shot noise, that is caused by an intrinsic characteristic of the image sensor 16.

Third Application Example

In the following, a description is given of a third application example of the image processing device 82 that can be applied to the image reading apparatus 10.

In step S3 of FIG. 3, the noise removal portion 82a according to the present application example determines whether or not the selection condition is satisfied by determining whether or not all of the first selection condition, the second selection condition, and a third selection condition described below, are satisfied.

The third selection condition is that a first auxiliary selection condition or a second auxiliary selection condition, both described below, is satisfied.

The first auxiliary selection condition is that, among the data of three pixels that are the pixel of interest P22 and its neighboring pixel pair positioned along the target line, all differences are within a predetermined third selection reference range.

For example, when the target line is the third reference line RL3, the first auxiliary selection condition is that differences among the data of three pixels positioned along the reference line RL3, that is, the pixel of interest P22 and the two neighboring pixels P11 and P33, are all within the third selection reference range.

The second auxiliary selection condition is that, among the data of three pixels that are the pixel of interest P22 and its neighboring pixel pair positioned along another reference line that is perpendicular to the target line, all differences are within a predetermined fourth selection reference range.

For example, when the target line is the third reference line RL3, the second auxiliary selection condition is that differences among the data of three pixels positioned along the reference line RL4, that is, the pixel of interest P22 and the two neighboring pixels P13 and P31, are all within the fourth selection reference range.

It is noted that, similarly to the example describing the first and second selection conditions, the first and second auxiliary selection conditions may compare the absolute value of each difference with a threshold value.

By adopting the present application example, the same effect as the embodiment described above can be achieved.

Fourth Application Example

In the image reading apparatus 10, the light emitting portion 12, the lens 15, and the image sensor 16 may be replaced with a CIS (Contact Image Sensor). In this case, the CIS is movably supported by the scanning mechanism 13.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing device configured to correct, in two-dimensional target image data, pixel data that includes noise, the image processing device comprising:
   a processor configured to:
      sequentially select, from the target image data, data of a 3×3 target pixel group that is made up of one pixel of interest and eight neighboring pixels that neighbor the pixel of interest;
      select, for each piece of data of the target pixel group, sample pixels from the eight neighboring pixels, according to a predetermined rule;
      calculate, for each piece of data of the target pixel group, a sample average value that is an average value of data of the sample pixels; and
      replace, for each piece of data of the target pixel group, data of the pixel of interest with a correction value that is based on the sample average value, on a necessary condition that a difference of interest, that is a difference between the data of the pixel of interest and the sample average value, exceeds a predetermined correction reference range, wherein
   the processor selects, as a target line, each of four reference lines that respectively pass through the pixel of interest in a row direction, a column direction, and two diagonal directions that intersect the row and column directions, and
   on a necessary condition that a difference between data of a pair of the neighboring pixels that are positioned neighboring the pixel of interest along the target line, is within a predetermined first selection reference range, and that with respect to at least one of two areas on both sides of the target line, all differences among data of three neighboring pixels that exist in the area are within a predetermined second selection reference range, the processor selects the pair of neighboring pixels as the sample pixels.

2. The image processing device according to claim 1, wherein
   when the target image data is one of three pieces of monochromatic image data that respectively represent images of three different color components in the same image,
   the processor replaces, for each piece of data of the target pixel group, the data of the pixel of interest with a correction value that is based on the sample average value, on a further necessary condition that the difference of interest of the target image data, and the differences of interest of corresponding data of the target pixel group in the monochromatic image data representing images of the other two color components, have the same sign or are within a predetermined same range.

3. The image processing device according to claim 1, wherein
when the difference of interest exceeds a predetermined first correction reference range, the processor replaces the data of the pixel of interest with the sample average value, and when the difference of interest is within the first correction reference range and exceeds a predetermined second correction reference range that is a part of the first correction reference range, the processor replaces the data of the pixel of interest with a weighted average value of the data of the pixel of interest and the sample average value.

4. The image processing device according to claim 1, wherein
on a further necessary condition that all differences among data of three pixels, made up of the pixel of interest and the pair of neighboring pixels that are positioned neighboring the pixel of interest along the target line, are within a predetermined third selection reference range, or that all differences among data of three pixels, made up of the pixel of interest and a pair of the neighboring pixels that are aligned along another reference line that is perpendicular to the target line, are within a predetermined fourth selection reference range, the processor selects the pair of neighboring pixels positioned along the target line as the sample pixels.

5. An image reading apparatus, comprising:
a document sheet reading device configured to read an image from a document sheet, and output image data that represents the read image; and
the image processing device according to claim 1 configured to process, as the target image data, the image data output from the document sheet reading device.

6. An image processing method of correcting, in two-dimensional target image data, pixel data that includes noise, the image processing method comprising:
sequentially selecting, from the target image data, data of a 3×3 target pixel group that is made up of one pixel of interest and eight neighboring pixels that neighbor the pixel of interest;
selecting, for each piece of data of the target pixel group, sample pixels from the eight neighboring pixels, according to a predetermined rule;
calculating, for each piece of data of the target pixel group, a sample average value that is an average value of data of the sample pixels; and
replacing, for each piece of data of the target pixel group, data of the pixel of interest with a correction value that is based on the sample average value, on a necessary condition that a difference of interest, that is a difference between the data of the pixel of interest and the sample average value, exceeds a predetermined correction reference range, wherein
in the selecting of the sample pixels, the image processing method includes selecting, as a target line, each of four reference lines that respectively pass through the pixel of interest in a row direction, a column direction, and two diagonal directions that intersect the row and column directions, and
selecting, on a necessary condition that a difference between data of a pair of the neighboring pixels that are positioned neighboring the pixel of interest along the target line, is within a predetermined first selection reference range, and that with respect to at least one of two areas on both sides of the target line, all differences among data of three neighboring pixels that exist in the area are within a predetermined second selection reference range, the pair of neighboring pixels as the sample pixels.

* * * * *